United States Patent Office 2,982,656
Patented May 2, 1961

2,982,656
PROCESSES OF COLORING FOODSTUFFS
Edward E. Langenau, Westwood, N.J., assignor to Fritzsche Brothers, Inc., New York, N.Y., a corporation of New York
No Drawing. Filed Feb. 15, 1960, Ser. No. 8,501
14 Claims. (Cl. 99—148)

This invention relates to coloring foodstuff and more particularly to the processes for imparting color to foodstuff by the utilization of curcumin.

Turmeric, the main color component of which is curcumin, is used extensively for coloring of foods such as pickles and meats. Two difficulties stem from the inherent characteristics of the curcumin utilized in the practice of such coloring by present day methods. One is that curcumin has poor solubility and the other is that the oleoresin turmeric contains considerable quantities of resins and other undesirable materials. In one method, non-ionic surface active agents, such as esters of fatty acids sold under the trade name, Tween, are employed in conjunction with the oleoresin turmeric. Although such surface acting agents effect a fine dispersion of the color in the foods, they do entail introducing another additive to contact the foodstuff and they do not completely eliminate the resins and other undesirable materials associated with the oleoresin turmeric.

In accordance with this invention, foodstuff is colored by the utilization of curcumin efficiently without the use of solubilizing agents and without involvement of resins and other undesirable materials commonly associated with the employment of oleoresin turmeric. The process comprises contacting a foodstuff with a water soluble salt of curcumin and causing curcumin to be liberated from the water soluble salt. When the curcumin is so liberated, it is sorbed on the foodstuff. One procedure of effecting the liberation is to contact a solution of a water soluble salt of curcumin with a foodstuff in an acidic medium. The acidic medium present is in sufficient amount to liberate the curcumin from the water soluble salt. The curcumin is then precipitated in a finely divided state and is sorbed on the surface of the foodstuff and results in a well dispersed, clear yellow color. Since the products of liberation are curcumin and a water soluble salt of the acid in which the foodstuff is being processed, the objectionable resins associated with oleoresin turmeric are substantially eliminated. Alternatively, a foodstuff may be placed in a neutral or slightly alkaline solution of a water soluble salt of curcumin and then acidified with an acid such as acetic acid in the form of vinegar or otherwise, phosphoric acid or lactic acid in sufficient quantity and of suitable concentration to liberate the curcumin from its salt. The finely divided liberated curcumin is then sorbed by the foodstuff. Another procedure of practicing the processes of this invention is to add a water soluble salt of curcumin in the form of a dry powder, either as such or dispersed in a suitable carrier such as salt or cerelose, to an aqueous solution which is either already acid or which is subsequently acidified with an acid suitable for use in pickling brine. The brine is then circulated about the food product being processed in the usual manner and the released curcumin is sorbed on or deposited on the food product.

Alkali metal salts of curcumin, such as disodium curcumate and dipotassium curcumate, are preferably employed as the water soluble salt of curcumin and edible acids such as acetic, lactic and citric acid, are desirably employed as the acidic medium. The processes of this invention are adapted for the coloring of a variety of foodstuffs. For example, a fowl, such as a chicken, or fat may be treated with an aqueous solution of disodium curcumate either by dipping, brushing, spraying or other manner of application and the curcumin may be liberated by subsequently contacting the foodstuff with a solution of an acidic medium in sufficient quantity to liberate the curcumin.

An object of this invention is to color foodstuff substantially uniformly and more particularly to impart such coloring by the utilization of curcumin without any significant interference from the resins and other undesirable materials usually attendant with coloring by employment of oleoresin turmeric.

A more comprehensive understanding of this invention is obtained by reference to the following examples:

*Example 1*

An aqueous solution containing 15% by weight of disodium curcumate is added to an acid pickle brine in which are contained cucumbers. During the addition, the brine is agitated either manually or by mechanical means in order to distribute the curcumin, which is released, evenly throughout the solution. The released curcumin is permitted to be sorbed or deposited on the cucumbers being processed. The pickling process may be conducted by the usual procedure of circulating the brine containing the released curcumin by means of pumps through large tanks. Alternatively, the process may be performed in barrels, although this process ordinarily involves significantly more labor. Other food products which may be processed in the same fashion are sweet pickles, pickled onions, pickled cauliflower, pickled watermelon rind or pickled vegetables of any other variety.

*Example 2*

A dressed chicken is dipped into an aqueous solution containing 25% by weight of dipotassium curcumate. It is left immersed in this solution for a period of 15 minutes. The chicken is then withdrawn from the solution and immersed in a 15% aqueous solution of citric acid. The released circumin is sorbed on the surface of the chicken and the process may be repeated by alternately dipping the chicken in the solution of dipotassium curcumate and then in the acid.

*Example 3*

Disodium curcumate mixed with cerelose in the ratio of 1 to 1 is coated on a chicken and the coated chicken is then dipped in a 10% aqueous solution of lactic acid by weight. The acid is in sufficient strength and quantity to completely liberate the curcumin from the disodium curcumate. The curcumin is sorbed on the surface of the chicken to give it a rich yellow color.

What is claimed is:
1. The process of coloring foodstuff which comprises contacting the foodstuff with an alkali metal salt of curcumin and causing curcumin to be liberated by acidification from said alkali metal salt.
2. The process of coloring foodstuff which comprises contacting foodstuff with an alkali metal salt of curcumin, causing curcumin to be liberated by acidification from said alkali metal salt and sorbing the curcumin on said foodstuff.
3. The process of coloring foodstuff which comprises contacting a foodstuff in an acidic medium with an alkali metal salt of curcumin, the acidic medium being present in sufficient amount to liberate curcumin from the said alkali metal salt.
4. The process of coloring foodstuff which comprises contacting a foodstuff in an acidic medium with an alkali metal salt of curcumin, the acidic medium being present in sufficient amount to liberate curcumin from the said alkali metal salt and sorbing the curcumin on said foodstuff.

5. The process of coloring foodstuff which comprises contacting foodstuff with an alkali metal salt of curcumin and adding an acid thereto in sufficient amount to liberate curcumin from said alkali metal salt.

6. The process of coloring foodstuff which comprises contacting foodstuff with an alkali metal salt of curcumin, adding an acid thereto in sufficient amount to liberate curcumin from said alkali metal salt and sorbing the curcumin on said foodstuff.

7. The process of coloring foodstuff which comprises contacting foodstuff with disodium curcumate, causing curcumin to be liberated by acidification from said curcumate and sorbing the curcumin on said foodstuff.

8. The process of coloring foodstuff which comprises contacting foodstuff with dipotassium curcumate, causing curcumin to be ligerated by acidification from said curcumate and sorbing the curcumin on said foodstuff.

9. The process of coloring foodstuff which comprises contacting foodstuff in an acidic medium with a solution of disodium curcumate, the acidic medium being present in sufficient amount to liberate the curcumin from said disodium curcumate and sorbing the curcumin on said foodstuff.

10. The process of coloring foodstuff which comprises contacting foodstuff in an acidic medium with a solution of dipotassium curcumate, the acidic medium being present in sufficient amount to liberate the curcumin from said dipotassium curcumate and sorbing the curcumin on said foodstuff.

11. The process of coloring foodstuff which comprises contacting a foodstuff in the presence of a water soluble carboxylic acid with an alkali metal salt of curcumin, the carboxylic acid being present in sufficient amount to liberate curcumin from said alkali metal salt of curcumin and sorbing the curcumin on said foodstuff.

12. The process of coloring foodstuff in accordance with claim 11, in which the water soluble carboxylic acid is acetic acid.

13. The process of coloring foodstuff in accordance with claim 11, in which the water soluble carboxylic acid is citric acid.

14. The process of coloring foodstuff in accordance with claim 11, in which the water soluble carboxylic acid is lactic acid.

References Cited in the file of this patent

"Synthetic Food Adjuncts," by Jacobs, D. Van Nostrand Company, Inc., 250 Fourth Avenue, New York, 1947, pp. 9, 14, 15, 22, 51 and 52.